United States Patent
Haerterich

(10) Patent No.: US 10,491,615 B2
(45) Date of Patent: Nov. 26, 2019

(54) USER CLASSIFICATION BY LOCAL TO GLOBAL SEQUENCE ALIGNMENT TECHNIQUES FOR ANOMALY-BASED INTRUSION DETECTION

(71) Applicant: SAP SE, Walldorf (DE)

(72) Inventor: Martin Haerterich, Wiesloch (DE)

(73) Assignee: SAP SE, Walldorf (DE)

( * ) Notice: Subject to any disclaimer, the term of this patent is extended or adjusted under 35 U.S.C. 154(b) by 311 days.

(21) Appl. No.: 15/401,861

(22) Filed: Jan. 9, 2017

(65) Prior Publication Data
US 2018/0198810 A1  Jul. 12, 2018

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01)

(58) Field of Classification Search
CPC .... H04L 63/1425; H04L 63/168; G06N 20/00
See application file for complete search history.

(56) References Cited

U.S. PATENT DOCUMENTS

| | | | | |
|---|---|---|---|---|
| 7,818,272 | B1* | 10/2010 | Mishra | G06N 20/00 706/14 |
| 9,516,053 | B1* | 12/2016 | Muddu | G06F 16/254 |
| 9,727,723 | B1* | 8/2017 | Kondaveeti | G06F 21/50 |
| 9,977,884 | B2* | 5/2018 | Sarkar | G06F 21/316 |
| 2008/0151773 | A1* | 6/2008 | Kawaba | G06F 11/0748 370/252 |
| 2009/0049002 | A1* | 2/2009 | He | G06N 20/00 706/59 |
| 2013/0151536 | A1* | 6/2013 | Akoglu | G06F 16/2246 707/748 |
| 2016/0077910 | A1* | 3/2016 | Dev | G06F 11/0793 714/4.3 |
| 2016/0308884 | A1* | 10/2016 | Kent | G06K 9/6277 |
| 2017/0041144 | A1* | 2/2017 | Krapf | H04L 9/3234 |
| 2018/0018584 | A1* | 1/2018 | Nock | G06N 20/00 |
| 2018/0081779 | A1* | 3/2018 | Hiyama | G06F 11/3476 |
| 2018/0081914 | A1* | 3/2018 | Zoll | G06F 11/3452 |

OTHER PUBLICATIONS

Pons et al., "Computing Communities in Large Networks Using Random Walks," Journal of Graph Algorithms and Applications 10(2):191-218 (2006).

(Continued)

*Primary Examiner* — Michael R Vaughan
(74) *Attorney, Agent, or Firm* — Jones Day

(57) ABSTRACT

A sequence of events by a single user with at least one computing system are monitored. Each event characterizes user interaction with the at least one computing system and the sequence of events form a plurality of pairwise disjoint log samples. Thereafter, it is determined, using an adjacency graph trained using a plurality of log samples generated by a plurality of users, whether any of the log samples is anomalous. Data can be provided that characterizes the log samples determined to be anomalous. Related apparatus, systems, techniques and articles are also described.

20 Claims, 4 Drawing Sheets

(56) References Cited

OTHER PUBLICATIONS

SAP SE. (2016). RFC Interface—Components of SAP Communication Technology. Retrieved from SAP Library: https://help.sap.com/saphelp_nwpi711/helpdata/en/48/89653184b84e6fe10000000a421937/content.htm (Retrieved Jan. 9, 2017, 2 pages).
Smith et al., "Identification of common molecular subsequences," J. Mol. Biol. 147(1):195-197 (1981).
Strace(1)—Linux manual page. (Dec. 5, 2016). Retrieved from The Linux man-pages project: http://man7.org/linux/man-pages/man1/strace.1.html (Retrieved Jan. 9, 2017, 11 pages).
Wikipedia. (Sep. 9, 2016). Jaccard Index. Retrieved from Wikipedia—the free encyklopedia: https://en.wikipedia.org/wiki/Jaccard_index (Retrieved Jan. 9, 2017, 6 pages).

\* cited by examiner

USER CLASSIFICATION BY LOCAL TO GLOBAL SEQUENCE ALIGNMENT TECHNIQUES FOR ANOMALY-BASED INTRUSION DETECTION

TECHNICAL FIELD

The subject matter described herein relates to the detection of anomaly-based intrusion detection in computing systems and landscapes using user classification by local to global sequence alignment.

BACKGROUND

Complex and connected business computer systems are a valuable target for attackers trying to infiltrate and manipulate core processes of companies. User accounts that have been compromised by targeted attacks and/or social engineering as well as malicious insiders can lead to a situation in which even valid and authenticated system users should not be trusted unconditionally. In such an environment, application level intrusion detection systems become increasingly important as an additional line of defense which alerts administrators to unusual behavior in their systems.

SUMMARY

In one aspect, a sequence of events by a single user with at least one computing system are monitored. Each event characterizes user interaction with the at least one computing system and the sequence of events form a plurality of pairwise disjoint log samples. Thereafter, it is determined, using an adjacency graph trained using a plurality of log samples generated by a plurality of users, whether any of the log samples is anomalous. Data can be provided that characterizes the log samples determined to be anomalous.

Providing data can include displaying at least one a portion of the data characterizing the log samples determined to be anomalous in an electronic visual display, persisting at least one a portion of the data characterizing the log samples determined to be anomalous in physical data storage, loading at least one a portion of the data characterizing the log samples determined to be anomalous in memory, and/or transmitting at least one a portion of the data characterizing the log samples determined to be anomalous to a remote computing system. In other cases, providing data can include generating an alert identifying activity of the user as being anomalous.

The monitoring and determining can be performed by an intrusion detection system including at least one computing device monitoring communications between a client computing device and at least one backend server.

The monitored events can include categorical data characterizing remote functions associated with the at least one computing system. The remote functions can include: Open Data Protocol (OData) services, XMLHttpRequests (XHR), and/or Remote Function Calls (RFCs).

The monitored events can include events involving an operating system of the at least one computing system.

The monitored events can characterize interaction of the single user with at least one database table in a remote database.

The monitored events can characterize user interaction with a graphical user interface rendered on an electronic visual display associated with the at least one computing system.

The monitored events can characterize data exchange volume between the at least one computing system and at least one remote computing system.

The monitored events can characterize data exchange periodicity and/or frequency between the at least one computing system and at least one remote computing system.

The adjacency graph can be generated by calculating, for each of a plurality pairs of historically generated log samples, an asymmetric adjacency. The adjacency graph can be generated by calculating, for each of a plurality pairs of historically generated log samples, a symmetric adjacency based on the calculated asymmetric adjacency. Vertices and edges of the adjacency graph can be based on the calculated asymmetric adjacency and symmetric adjacency.

In some variations, the adjacency graph can be previously generated and static. In other variations, the adjacency graph can be dynamically updated as additional events are monitored.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced rates for detecting unauthorized intrusions into computing systems. In particular, the current subject matter provides improved rates for finding anomalous log samples as compared to conventional techniques.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to techniques for monitoring user interaction with computing systems to identify anomalies in the manner in which such users are utilizing such computing systems. These techniques examine sequences of events describing the user system interaction on a fine-grained scale and apply a local sequence alignment algorithm to portions of such sequences.

Figure 1:
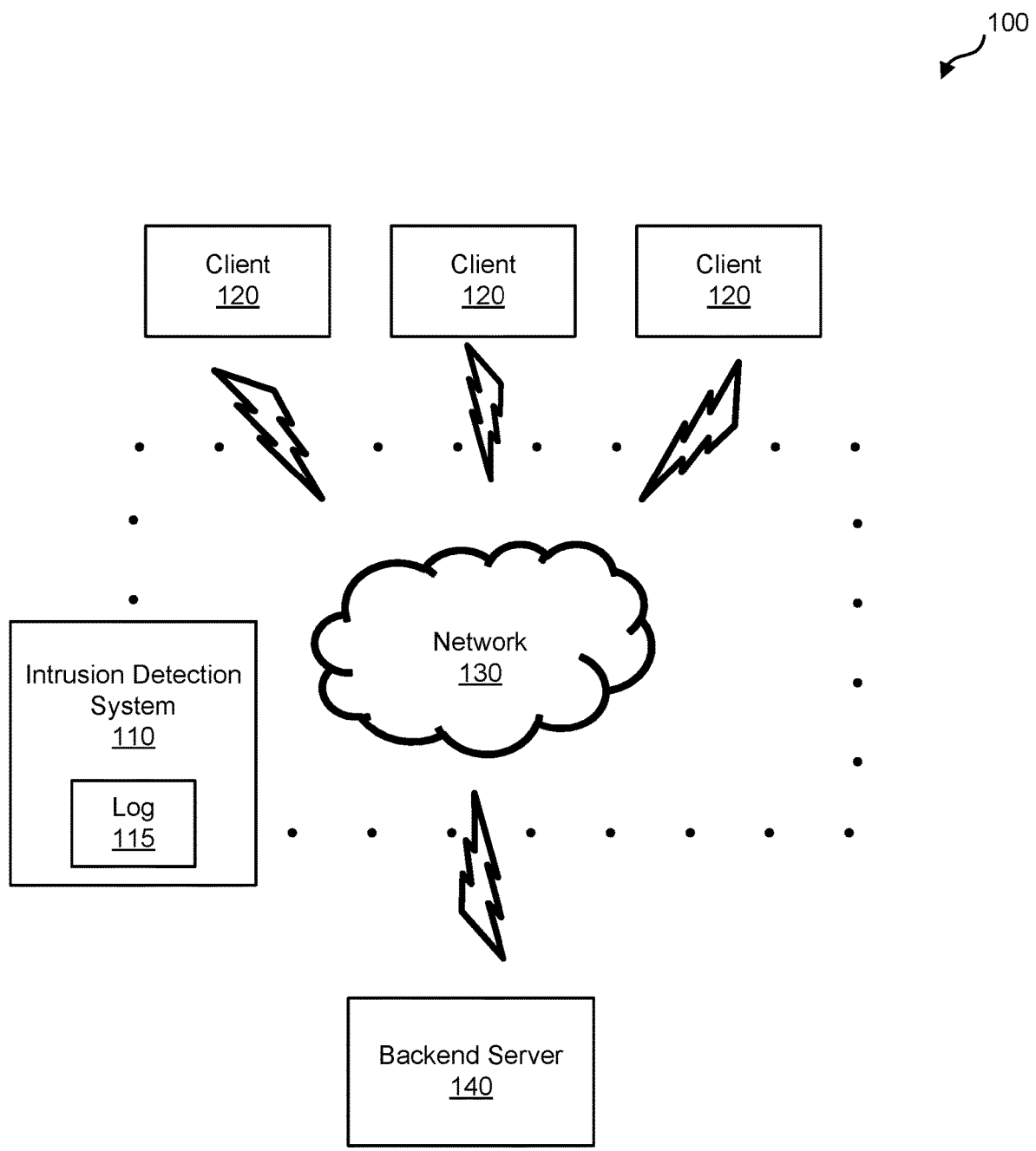
FIG. 1 is a system architecture diagram illustrating an intrusion detection monitoring system.

FIG. 1 is a diagram 100 illustrating a sample computing architecture for use with an intrusion detection system 110. The intrusion detection system 110 can include one or more computing devices that each comprise memory and one or more data processors. As illustrated, there can be a plurality of client computing devices 120 (which, in turn, can each include memory and at least one data processor) which communication with a backend server 140 over a computing network 130. The clients 120 and the backend server 140 can communicate with each other in various wired and unwired manners and, in some cases (not illustrated), the clients 120 and/or the backend server 140 can communicate in a peer-to-peer fashion.

The intrusion detection system 110 can employ various software hooks or other techniques to monitor the events at the clients 120 and/or at the backend server 140. In some cases, the monitoring can include the interception of events over the network 130 as they originate and/or are received from the clients 120 (as indicated by the dotted lines) and/or as they originate and/or are received by the server 140. The monitored events can be stored within a log 115 which can, in some cases, form part of the intrusion detection system 110. It will be appreciated that the log 115 can be stored elsewhere and/or be distributed amongst different computing nodes. It will also be appreciated that the monitoring of events can occur locally at the clients 110 and/or the server 140 and that information characterizing such events can be analyzed locally and/or transmitted to a remote computing node.

The techniques described herein and utilized by the intrusion detection system 110 can be applied to any kind of sequential data which reflects the interaction of an individual with a computer system or the interaction between different computer systems such as sequences of categorical data and/or sequences of metric data.

The categorical data can include a variety of indicators, including, without limitation, remote functions such as: Open Data Protocol Services (OData) services/calls, XMLHttpRequests (XHR) or other APIs in the form of an object (provided by a browser's JavaScript environment) whose methods transfer data between a web browser or application and a web server, and/or Remote Function Calls (RFC). Information about remote function calls can be collected either at the caller or at the recipient side. However, depending on the exact system landscape either of these might not be accessible in all cases. For example, for service calls to third party systems which are not connected to the intrusion detection system 110, the monitoring should take place at client side. There can be dedicated software components at the caller which act as adapters to send out such requests and which provide adequate tracing/logging capabilities to record logs of the (outgoing) interactions.

In other cases data from the caller side may be difficult to obtain. For example when only a single web application server is connected to our intrusion detection system and we are not aware of what goes on in the client (e.g. the end user's web browser). In this case data is collected at the recipient side which likewise provides base level code like inbound http-logging etc.

The categorical data can additionally or alternative include operation system functions such as Linux system calls/signals and the like. Such information is about calls inside one single system (from application code to operation system functionality). Operating systems can provide features to trace these calls and write them (typically in an aggregated form to save resources) to the file system or send it to a remote machine.

In addition, the categorical data can include how the user interacts with database tables and/or which database tables the user interacts. Queries can be monitored/intercepted to analyze the SQL statements (e.g., table names within the SQL statements, etc.). Further, the categorical data can include various information about interaction by the user with UI elements presented in a browser/application/software (such as buttons depressed, input fields, scroll bars, and the like). For example, the user interaction steps can be directly sent to a remote server or in other cases they can be monitored based on which client side code is triggered.

The sequences of metric data can include various attributes which characterize data exchange from and/or to the client device. For example, the sequences of metric data can include data transfer volumes and periodicity of data exchange, pauses between interaction steps, and the like.

Each sequence can, in some variations, be assumed to be associated with actions related to only one user. Such an arrangement is achieved using log data. In other variations, data linked to a specific user context can be used to separate parallel sessions of the same user. Stated differently, the same user may at the same point in time interact with a computer system in more than one context e.g. when he calls the same web application from two different browser windows or even from two different devices (PC and mobile say). Although he or she logs in as the same user (and with the same credentials) the interactions of the two or more contexts are clearly separated from the point of view of the system acting as the web server. Session IDs can be assigned for each (new) context.

In the case of system-system interaction, the term user refers to a technical user (that is an account in the system where the triggering application runs). In some variations, the user can be a specific client computing device.

The sequences can be generated or later modified (i.e., harmonized, etc.) so that they are approximately of uniform length either with respect to the number of entries or (if the entries carry time stamps) with respect to time interval they are contained in. If the sequences are not initially substantially uniform, then the monitored sequences can be cut into slices as a pre-processing step. As one example, sub-sequences corresponding to 10 minute intervals can be examined. A ten minute interval of remote function calls can comprise several hundred events. As used herein, a single data point in a sequence is referred to as an event and to slices/groups of sequences as log samples.

The follow is directed to learning how typical log samples look like given a sufficiently large training set of benign log samples and to the classification of a single log sample as being normal or anomalous.

Given two log samples A and B, their asymmetric adjacency $a_{ass}(A,B)$ can be defined as a measure how well local snippets of sample A fit to sample B. This asymmetric adjacency can depend on three parameters:

| | |
|---|---|
| window_size . . . | length of the local snippets considered (i.e., a number of events); |
| match_val . . . | a positive score value for exact matches of events; and |
| gap_penalty . . . | a negative score value for gaps introduced for matching. |

Typical values can be, for example, $window_{size}=20$, match_val=0.0 and gap_penalty=0.8.

A sliding window of length window_size can move over a complete sample A and at each position calculate the optimal local alignment score between the sub-sample of A (cut out by the window) and the complete sample B using, for example, the Smith-Waterman algorithm (Smith & Waterman, 1981) with parameters match_val and gap_penalty for matching events respectively for gaps to be introduced. Now $a_{ass}(A,B)$ is the arithmetic mean of all these local alignment scores divided by the window_size (for normalization).

It will be appreciated that other measures that give a score (characterizing level of alignment) from a bounded domain to a pair of sequences (A and B) such that in case every connected subsequence of A is also a connected subsequence of B can be used to obtain a maximal possible score. In addition, in other cases (in particular, if the sequences are random or at least randomly permuted), a substantially lower score would be obtained.

Similarly, given the two log samples A and B, the asymmetric adjacency $a_{ass}(B,A)$ can be defined as a measure how well local snippets of sample B fit to sample A. In addition, a sliding window of length window_size can move over the complete sample B and at each position calculate the optimal local alignment score between the sub-sample of B (cut out by the window) and the complete sample A using the Smith-Waterman algorithm with parameters match_val and gap_penalty for matching events resp. for gaps to be introduced. Now $a_{ass}(B,A)$ is the arithmetic mean of all these local alignment scores divided by the window_size (for normalization).

Using $a_{ass}(A,B)$, the symmetric adjacency $a_{sym}(A,B)$ of two log samples A and B can be defined as the geometric mean of $a_{ass}(A,B)$ and $a_{ass}(B,A)$:

$$a_{sym}(A,B)=\sqrt{a_{ass}(A,B) \cdot a_{ass}(B,A)}$$

Note that the adjacency $a_{sym}(p)$ defined as above yields big values in case every snippet of A or B can be well aligned with some snippet in the other sample. The adjacency value decreases when there are events in either of the samples which do not match anything in the other sample and/or when the order of events is permuted. The adjacency decreases only slightly when there are small variations in the snippets that still amount to a good alignment score in the Smith-Waterman algorithm.

Continuing with clustering on the adjacency graph of all training samples, an adjacency graph Γ of all the training log samples can be examined. The adjacency graph Γ can be a graph having vertices corresponding to the samples with edges between all samples A and B with adjacency $a_{sym}(A,B) \geq s$ for some (small) threshold s>0. Any such edge can be assigned the weight $a_{sym}(A,B)$.

Figure 2:
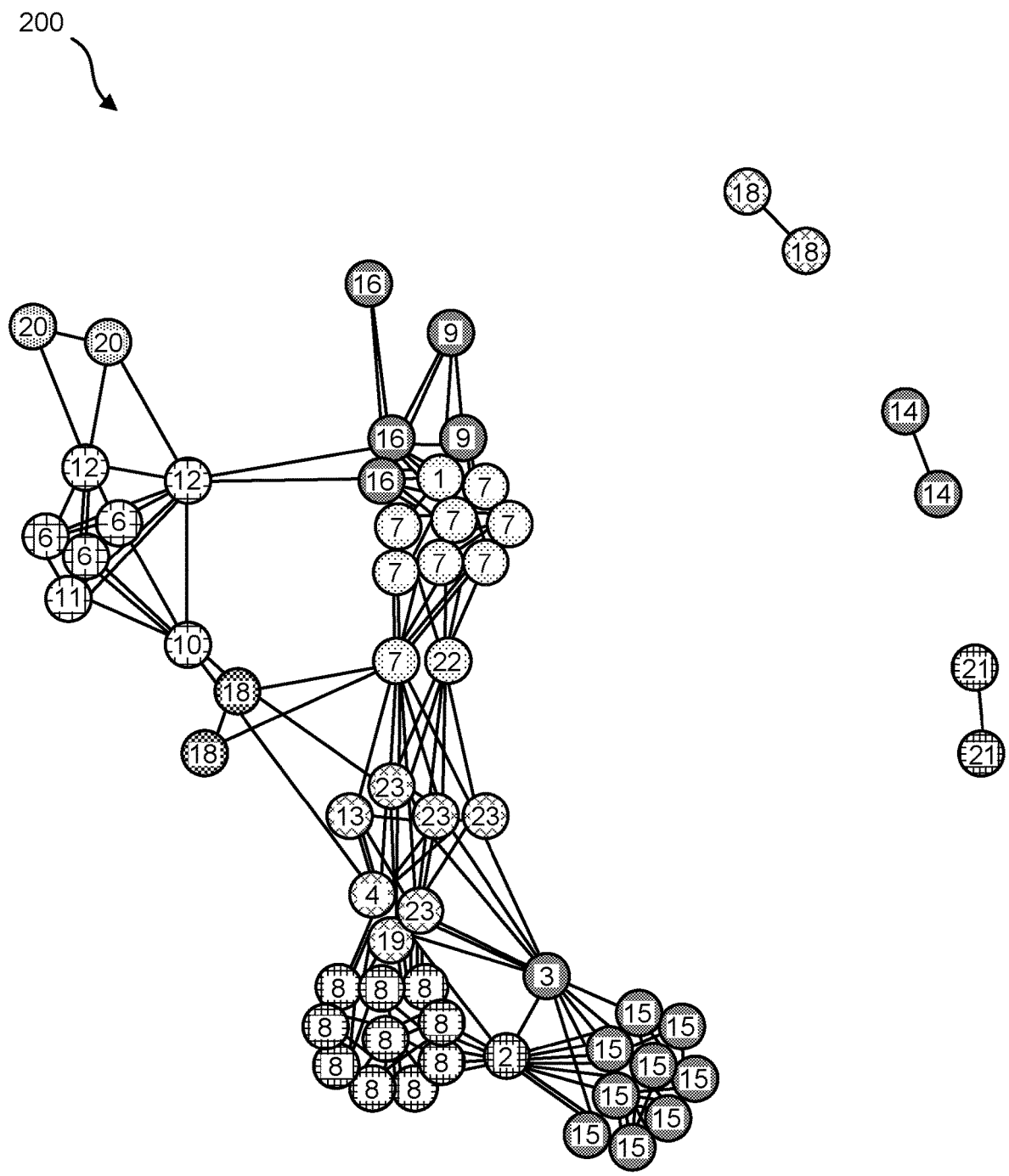
FIG. 2 is a diagram illustrating a user clustering graph.

The vertices of the graph can be clustered depending on the weights. Various types of clustering techniques can be utilized including random walk based clustering. Diagram 200 of FIG. 2 is a diagram in which the different color shading characterizes clustering and the numbers denote (anonymized) users. The example illustrated in FIG. 2 shows that log samples from several users can form a single cluster (e.g. the cluster in the center of users 4, 13, 19, and 23) when these users have very similar roles and that the same user may be assigned to more than one cluster (e.g. user 18).

As a result, for each of the clusters i (for i=1, 2, . . . , $t_{max}$) of the graph Γ that contain at least two vertices, a triple ($L_i$, $U_i$, $a_i$) can be stored where:

$L_i$ . . . an arbitrary log sample of the cluster;
$U_i$ . . . the set of users assigned to the cluster; and
$a_i$ . . . the minimal adjacency between samples inside the cluster.

Once these triples are stored, the training phase can be considered to be completed.

Continuing with an interference of anomalous log samples. An adjacency factor α<1 can be set (typically α=0.5). During operation of the intrusion detection system 110, log samples of the same kind as utilized during training can be obtained and stored in the log 115. Let L be such a sample for the user usr. Then, the sample can be considered as anomalous whenever $$a_{sym}(L_i L_i) < \alpha \cdot a_i$$

for all clusters i such that usr belongs to U_i.

At run-time log samples are taken continuously and checked for anomalies by the intrusion detection system 110. Depending on a monitoring policy consequences of anomalies can include one or more of: pure logging (and subsequent manual inspection), aborting the current user interaction, aborting the current user session, locking the user, and/or complete system shutdown.

Log samples that have been classified as anomalous by manual inspection (or by other means) can be collected and be the basis for a subsequent re-training of the intrusion detection system.

The rationale behind this is that the current intrusion detection system 110 aims at detecting log samples which are too far off any of the learned clusters.

Experiments (based on data for remote communication) demonstrated that the current techniques for finding anomalous log samples performs better than a frequency based approach counting N-grams in these log samples and comparing the top k occurring N-grams using the Jaccard distance.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 3:
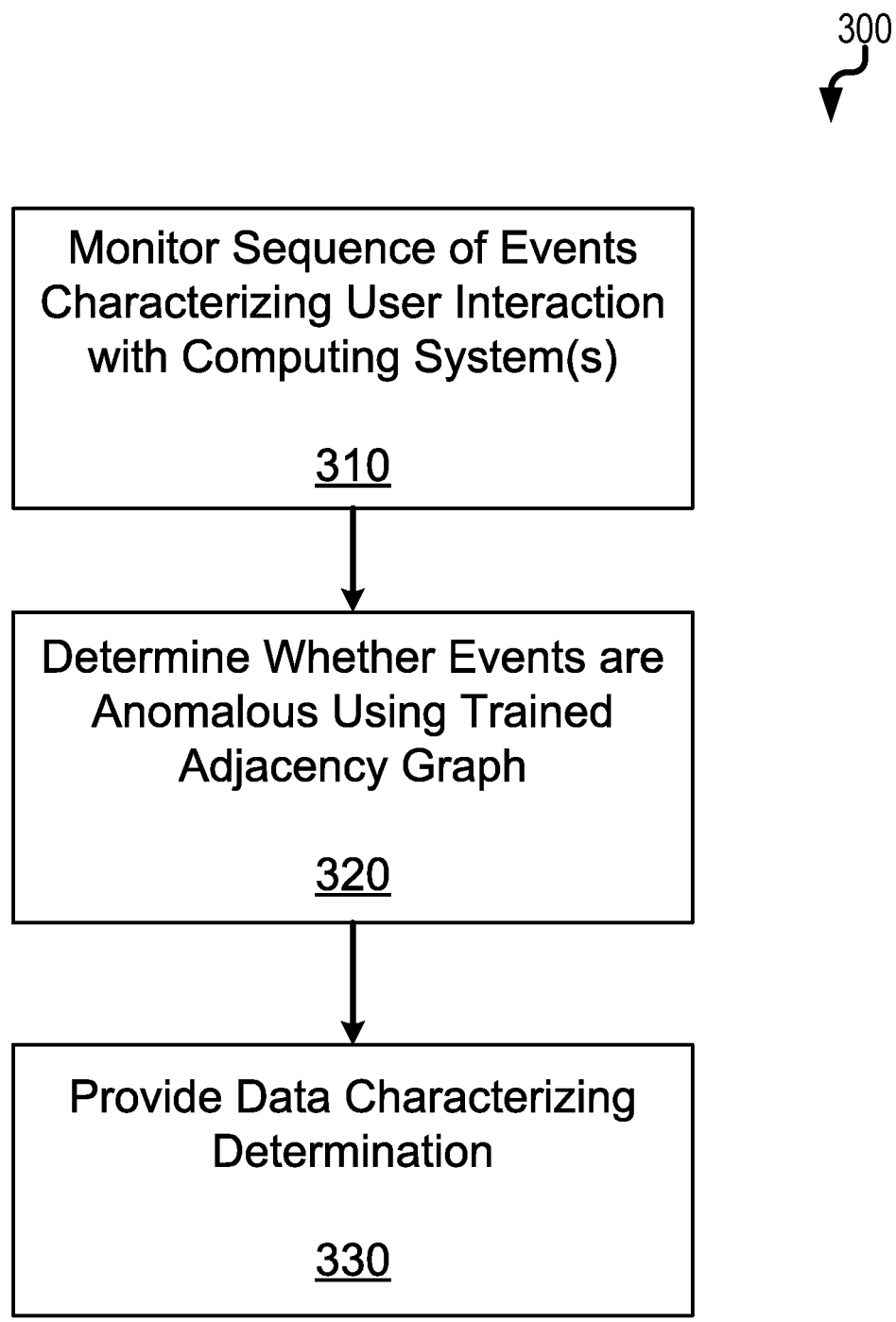
FIG. 3 is a process flow diagram illustrating detection of anomalous user activity within a computing system.

FIG. 3 is a process flow diagram 300 in which, at 310, a sequence of events by a single user with at least one computing system are monitored. Each event characterizes user interaction with at least one computing system. The sequence of events form a plurality of pairwise disjoint log samples. Thereafter, it is determined, at 320, using an adjacency graph (e.g., a previously generated adjacency graph, a dynamically updated adjacency graph, etc.) trained using a plurality of log samples generated by a plurality of users, whether any of the log samples is anomalous. Data can later be provided, at 330, that characterizes the log samples determined to be anomalous.

Figure 4:
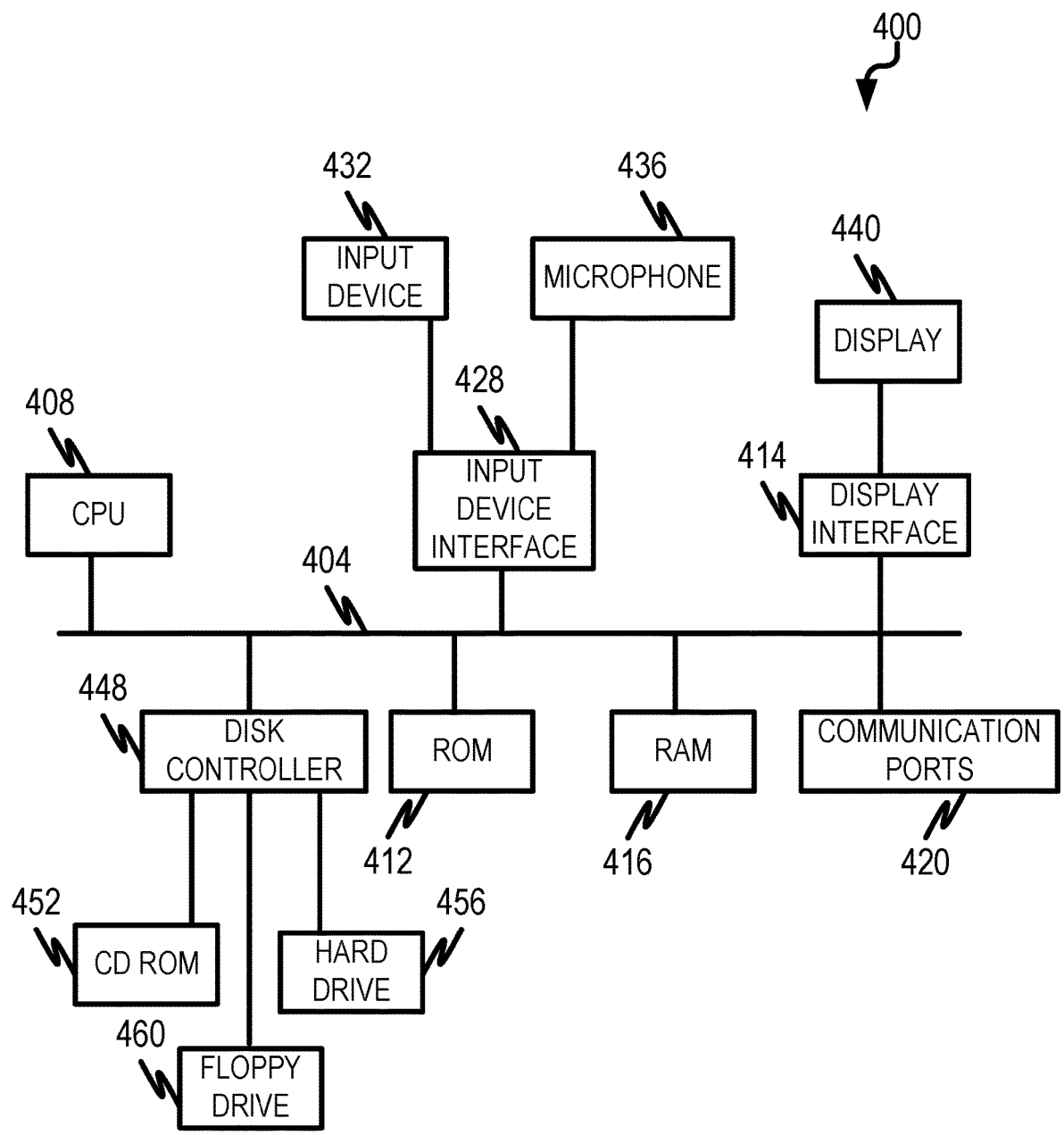
FIG. 4 is a logical diagram illustrating a computing device for implementing aspects described herein.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. In the input device 432 and the microphone 436 can be coupled to and convey information via the bus 404 by way of an input device interface 428. Other computing devices, such as dedicated servers, can omit one or more of the display 440 and display interface 424, the input device 432, the microphone 436, and input device interface 428.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing system, the method comprising:

monitoring a sequence of events by a single user with at least one computing system, each event characterizing user interaction with the at least one computing system, the sequence of events forming a plurality of pairwise disjoint log samples;

determining, using an adjacency graph trained using a plurality of log samples generated by a plurality of users, whether any of the log samples is anomalous; and providing data characterizing the log samples determined to be anomalous;

wherein the adjacency graph is generated by:
calculating, for each of a plurality pairs of historically generated log samples, an asymmetric adjacency which characterizes how well a first sample fits to a second sample and a symmetric adjacency which characterizes how well the second sample fits to the first sample; and defining vertices and edges of the adjacency graph are based on the calculated asymmetric adjacency and symmetric adjacency.

2. The method of claim 1, wherein the providing data comprises at least one of: displaying at least one a portion of the data characterizing the log samples determined to be anomalous in an electronic visual display, persisting at least one a portion of the data characterizing the log samples determined to be anomalous in physical data storage, loading at least one a portion of the data characterizing the log samples determined to be anomalous in memory, or transmitting at least one a portion of the data characterizing the log samples determined to be anomalous to a remote computing system.

3. The method of claim 1, wherein the providing data comprises generating an alert identifying activity of the user as being anomalous.

4. The method of claim 1, wherein the monitoring and determining are performed by an intrusion detection system including at least one computing device monitoring communications between a client computing device and at least one backend server.

5. The method of claim 1, wherein the monitored events comprise categorical data characterizing remote functions associated with the at least one computing system.

6. The method of claim 5, wherein the remote functions comprise one or more of: Open Data Protocol (OData) services, XMLHttpRequests (XHR), or Remote Function Calls (RFCs).

7. The method of claim 1, wherein the monitored events comprise events involving an operating system of the at least one computing system.

8. The method of claim 1, wherein the monitoring comprises intercepting queries to analyze table names within SQL statements to log which database tables with which the user is interacting.

9. The method of claim 1, wherein the monitored events characterize user interaction with a graphical user interface rendered on an electronic visual display associated with the at least one computing system.

10. The method of claim 1, wherein the monitored events characterize data exchange volume between the at least one computing system and at least one remote computing system.

11. The method of claim 1, wherein the monitored events characterize data exchange periodicity and/or frequency between the at least one computing system and at least one remote computing system.

12. The method of claim 1, wherein the adjacency graph is generated by calculating, for each of a plurality pairs of historically generated log samples, an asymmetric adjacency.

13. The method of claim 12, wherein the adjacency graph is generated by calculating, for each of a plurality pairs of historically generated log samples, a symmetric adjacency based on the calculated asymmetric adjacency.

14. The method of claim 13, wherein vertices and edges of the adjacency graph are based on the calculated asymmetric adjacency and symmetric adjacency.

15. The method of claim 1, wherein the adjacency graph is previously generated and static.

16. The method of claim 1, wherein the adjacency graph is dynamically updated as additional events are monitored.

17. A system comprising:
at least one data processor; and
memory storing instructions which, when executed by the at least one data processor, result in operations comprising:
monitoring a sequence of events by a single user with at least one computing system, each event characterizing user interaction with the at least one computing system, the sequence of events forming a plurality of pairwise disjoint log samples;

determining, using an adjacency graph trained using a plurality of log samples generated by a plurality of users, whether any of the log samples is anomalous; and providing data characterizing the log samples determined to be anomalous;

wherein the adjacency graph is generated by:
calculating, for each of a plurality pairs of historically generated log samples, an asymmetric adjacency which characterizes how well a first sample fits to a second sample and symmetric adjacency which characterizes how well the second sample fits to the first sample; and defining vertices and edges of the adjacency graph are based on the calculated asymmetric adjacency and symmetric adjacency.

18. The system of claim 17, wherein the adjacency graph is generated by calculating, for each of a plurality pairs of historically generated log samples, an asymmetric adjacency.

19. The system of claim 18, wherein:
the adjacency graph is generated by calculating, for each of a plurality pairs of historically generated log samples, a symmetric adjacency based on the calculated asymmetric adjacency;
vertices and edges of the adjacency graph are based on the calculated asymmetric adjacency and symmetric adjacency.

20. A non-transitory computer program product storing instructions which, when executed by at least one data processor forming part of at least one computing system, result in operations comprising:
monitoring a sequence of events by a single user with at least one computing system, each event characterizing user interaction with the at least one computing system, the sequence of events forming a plurality of pairwise disjoint log samples;

determining, using an adjacency graph trained using a plurality of log samples generated by a plurality of users, whether any of the log samples is anomalous; and providing data characterizing the log samples determined to be anomalous;

wherein the adjacency graph is generated by:

calculating, for each of a plurality pairs of historically generated log samples, an asymmetric adjacency which characterizes how well a first sample fits to a second sample and a symmetric adjacency which characterizes how well the second sample fits to the first sample; and defining vertices and edges of the adjacency graph are based on the calculated asymmetric adjacency and symmetric adjacency.

\* \* \* \* \*